United States Patent [19]
Kuroe et al.

[11] Patent Number: 5,618,448
[45] Date of Patent: Apr. 8, 1997

[54] GLASS SUBSTRATE HAVING SURFACE PROTRUSIONS FOR USE AS A MAGNETIC DISC SUBSTRATE

[75] Inventors: Toru Kuroe, Machida; Fumiaki Yokoyama, Kanagawa-ken; Daisuke Mouri, Yokohama, all of Japan

[73] Assignee: Mitsubishi Kasei Corporation, Tokyo, Japan

[21] Appl. No.: 447,604

[22] Filed: May 23, 1995

Related U.S. Application Data

[62] Division of Ser. No. 111,223, Aug. 24, 1993.

[30] Foreign Application Priority Data

Sep. 2, 1992 [JP] Japan .................... 4-234695

[51] Int. Cl.$^6$ .................... C03C 15/00; C09K 13/08
[52] U.S. Cl. .................... 216/97; 216/22; 252/79.3
[58] Field of Search .................... 216/22, 83, 97, 216/98; 252/79.2, 79.3

[56] References Cited

U.S. PATENT DOCUMENTS

| | | | |
|---|---|---|---|
| 2,989,384 | 6/1961 | Allen et al. | 216/97 |
| 3,616,098 | 10/1971 | Falls | 161/1 |
| 4,370,192 | 1/1983 | Cooley | 156/345 |
| 4,508,591 | 4/1985 | Bartlett et al. | 156/659.1 |
| 4,833,001 | 5/1989 | Kijima et al. | 428/141 |
| 4,985,306 | 1/1991 | Morizane et al. | 428/410 |
| 5,087,481 | 2/1992 | Chen et al. | 427/129 |
| 5,091,225 | 2/1992 | Goto | 427/430.1 |
| 5,131,977 | 7/1992 | Morizane et al. | 156/646 |

FOREIGN PATENT DOCUMENTS

| | | |
|---|---|---|
| 60-136035 | 7/1985 | Japan . |
| 63-160010 | 7/1988 | Japan . |
| 1-37722 | 8/1989 | Japan . |

*Primary Examiner*—R. Bruce Breneman
*Assistant Examiner*—Anita Alanko
*Attorney, Agent, or Firm*—David G. Conlin; Linda M. Buckley

[57] ABSTRACT

Disclosed herein is a substrate for a magnetic disc comprising a glass substrate having fine protrusions on its surface, the protrusions having a height of 50 to 1000 Å, a width of 0.01 to 1 μm, a density of 10 to 1000 per 100 μm$^2$ and an area ratio of 0.1 to 50%, and a ratio of peak height on a mean line ($R_p$) to maximum height ($R_{max}$) with respect to surface roughness of the substrate being at least 60%. Further, a process for preparing the substrate and a magnetic disc having the substrate are disclosed. Because the substrate according to the present invention has appropriate protrusions on its surface, a friction force and an adsorbing force between a head and a magnetic disc can be reduced, leading to the improvement of the CSS and the anti-head stick properties. In addition, the S/N ratio is not affected because the fine concave portions formed on the surface of the substrate are shallow.

4 Claims, 4 Drawing Sheets

GLASS SUBSTRATE HAVING SURFACE PROTRUSIONS FOR USE AS A MAGNETIC DISC SUBSTRATE

This is a divisional of application Ser. No. 08/111,223 filed on Aug. 24, 1993.

FIELD OF THE INVENTION

The present invention relates to a substrate for a magnetic disc, a method for preparing it and the magnetic disc comprising it.

PRIOR ART

A magnetic disc is formed by applying in order an undercoat film, a magnetic film and a protective film on a substrate according to any process such as sputtering, coating and depositing.

A magnetic storage is mainly composed of the magnetic disc and a magnetic head for recording and reproducing (hereinafter referred to as "head").

Before starting the magnetic storage, the head and the magnetic disc stand in contact with each other. On starting, the head is floated by applying the predetermined revolution to the magnetic disc, thereby a space between the head and the magnetic disc is produced. In this condition, the recording and reproducing are possible. On stopping, the revolution of the magnetic disc is stopped, thereby the head and the magnetic disc are returned to the condition before starting and they become to stand in contact with each other. The above mode is called as "a contact start stop mode (CSS mode)".

On starting and stopping, a frictional force produced between the head and the magnetic disc causes their wear, leading to the deterioration in magnetic properties, especially the recording and reproducing property. When the magnetic disc has large protrusions on its surface, the head is collided against the large protrusions and thereby, the head is floated unsteadily. As the result, the head and the magnetic disc are damaged, leading to the deterioration in recording and reproducing property. On the other hand, when the magnetic disc has an even surface or when moisture is entered in the space between the head and the magnetic disc by allowing to left the magnetic storage under high humidity, an adsorbing phenomenon is caused between the head and the magnetic disc. If the magnetic storage is started for operation in such a condition, a high resisting force is produced between the head and the magnetic disc and as the result, the head and the magnetic disc are damaged. This is called as "a head stick".

It is considered that the lower the friction force produced between the head and the magnetic disc is, the better the CSS-property is. The CSS-property is evaluated in a CSS test wherein the CSS mode is repeated to see the change in the friction force.

Up to now, substrates comprising aluminium alloys are widely used as the substrate for the magnetic disc. Recently, a glass substrate is proposed and extensively studied. The glass substrate is suitable for increasing a recording density, because it has the even surface without any large protrusion, it is rigid and hardly subjected to a plastic deformation and it has few defects on the surface, as compared with the aluminium alloy substrate.

However, the glass substrate has the defect of a large contact area between the head and the magnetic disc, because of its excellent surface evenness (smoothness). When the glass substrate is used, therefore, both the frictional force and the adsorbing force between the magnetic disc and the head are increased, leading to the deterioration in the CSS and anti-head stick properties.

As a method for resolving the defect of the glass substrate, it is proposed that fine convex-concave portions are formed on the glass substrate by a mechanical procedure so as to reduce the frictional force and the adsorbing force between the head and the magnetic disc. In this method, the production of microcracks are necessarily observed because the glass has a low plastic flow. Thus, the magnetic disc may be broken due to the lowering in the strength of the glass substrate and the magnetic film may be corroded due to the presence of the moisture which remains in the microcracks and is produced by condensation in them.

Other method is proposed, which comprises forming the fine convex-concave portions on the glass substrate by the mechanical procedure and then subjecting to a chemical etching treatment using an aqueous solution containing hydrofluoric acid and sulfuric acid or an aqueous solution containing fluoride so as to enlarge the resultant microcracks and remove them (please refer to JP-A-63-160010). This method has a defect that the mechanical procedure and the chemical etching treatment should be combined and that an optimal condition for the chemical etching treatment is restricted. Otherwise, pits and grooves are easily formed depending on the conditions for the chemical etching treatment.

Further, other method is proposed, which comprises subjecting the surface of the glass substrate to the chemical etching treatment using an aqueous solution of potassium fluoride and hydrofluoric acid (please refer to JP-A-63-225919 and JP-A-64-37722). This method has also the defect that the glass substrate is eroded very quickly due to the high concentration of hydrofluoric acid (for example, 4N and 6N in examples), thereby the convex-concave portions formed on the surface of the glass substrate are irregular and have diverse forms. In case of the convex-concave portions being irregular, the large protrusions are also formed on the surface of the glass substrate, leading to the deterioration in CSS property. In addition, excess concave portions are formed, thereby a reproducing noise is pronounced and a S/N ratio is lowered.

An object of the present invention is to provide the substrate for the magnetic disc, the substrate comprising the glass and having improved CSS and anti-head stick properties without lowering the S/N ratio. Another object of the present invention is to provide the method for preparing the above substrate and the magnetic disc having the above substrate.

SUMMARY OF THE INVENTION

The present invention provides the substrate for the magnetic disc comprising the glass substrate having fine protrusions on its surface, the protrusions having a height of 50 to 1000 Å, a width of 0.01 to 1 μm, a density of 10 to 1000 per 100 μm$^2$ and an area ratio of 0.1 to 50%, and a ratio of peak height on a mean line ($R_p$) to maximum height ($R_{max}$) with respect to surface roughness of the substrate being at least 60%.

The present invention provides the process for preparing the above substrate and the magnetic disc having the above substrate.

DETAILED DESCRIPTION OF THE INVENTION

The substrate for the magnetic disc (hereinafter referred to as "substrate") of the present invention is the glass substrate on which the fine protrusions are regularly formed.

The design of the protrusions according to the present invention is based on following findings.

It has been considered that the CSS and the anti-head stick properties are associated with the convex-concave portions on the surface of the substrate, that is, $R_{max}$. Even if $R_{max}$ is identical, the results of the CSS and the anti-head stick properties are occasionally reversed. That is, when convex portions are formed with suitable height and suitable distribution on the surface of the substrate, the contact area between the head and the magnetic disc is reduced, thereby the CSS and the anti-head stick properties are improved. On the other hand, when most of the surface of the substrate is occupied with concave portions, the contact area between the head and the magnetic disc is not effectively reduced and alternatively it is increased, thereby the above two properties are not improved and may be deteriorated. More constant the height of the convex portions in the protrusion of the surface, the higher the improvement of the CSS and the anti-head stick properties is. The reason is that the number of high protrusions caused by an inconstancy in the height of the protrusion is decreased, thereby the collision of the head against the high protrusions is prevented and the damage of the head and the magnetic disc is also prevented. In addition, the damage of the magnetic disc is prevented, because a load of the head is scattered on many protrusions.

Desirably, the concave portions is more shallow, in other words $R_{max}$ is smaller, in view of the reproducing noise of the magnetic disc.

The present inventors designed the protrusions, taking a separate notice of the convex portion concerned with the contact area between the head and the magnetic disc and the concave portion concerned with the reproducing noise. According to the present invention, the depth in the concave portions on the surface of the substrate is controlled not to lower the S/N ratio and simultaneously, the evenness of the convex portions is improved to improve the CSS and the anti-head stick properties.

Figure 1:
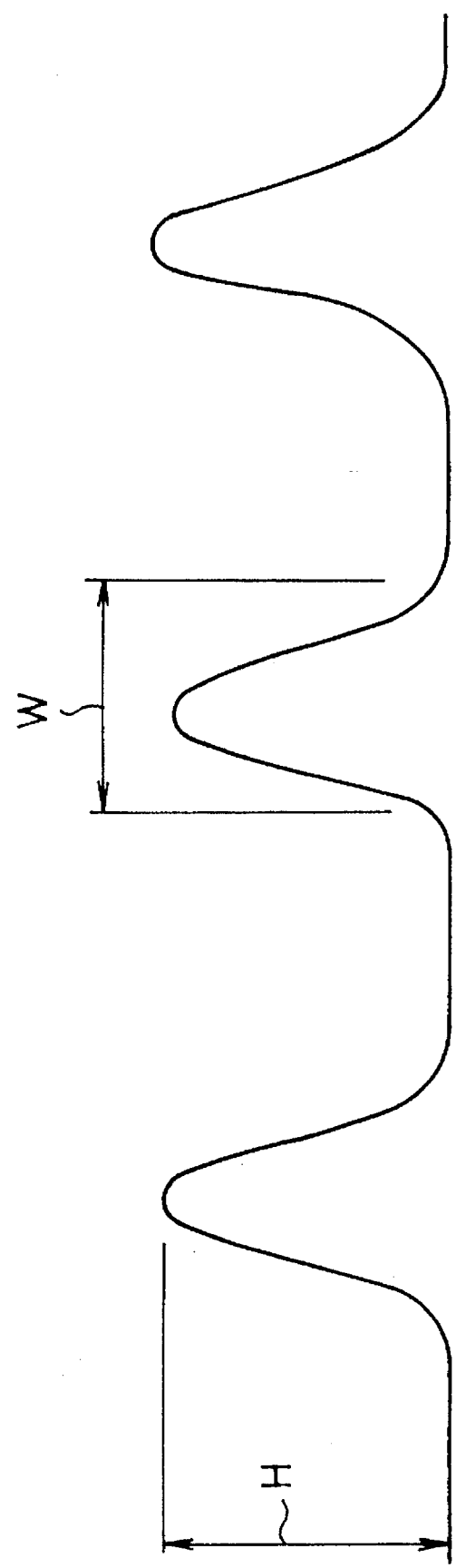
FIG. 1 shows a cross-section of the surface of the substrate according to the present invention.

FIG. 1 shows a cross-section of the surface of the substrate according to the present invention.

The substrate of the present invention has discontinuous and fine island protrusions on its surface, as shown in FIG. 1. An apex of each protrusion may be round or flat. The cross-section of the substrate according to the present invention has isotropic profiles in both radial and circumferential directions. Anisotropic profile is not observed.

The substrate of the present invention comprises the glass. As the glass, soda lime silicate glass, non-alkali glass, borosilicate glass, aluminosilicate glass, quartz glass, physically strengthened glass by air- or liquid-chilling, chemically strengthened glass and crystallized glass are usable.

The protrusions on the substrate of the present invention are characterized by their height, their width, their density and their area ratio, as well as the ratio of peak height on a mean line ($R_p$) to maximum height ($R_{max}$) with respect to surface roughness of the substrate.

The height of the protrusion means a distance from a flat part of the surface of the substrate to the top of the protrusion on the surface of the substrate (corresponding to "H" in FIG. 1). This is determined using a surface roughness meter ("Talystep" ex. Rank Taylor Hobson) having a stylus with a tip of 0.2 μm square, over 250 μm in length.

$R_p$ and $R_{max}$ are determined as described in the above. $R_p$ means a distance between the mean line and the highest peak over a given measuring length. And, $R_{max}$ means a distance between the highest peak and the deepest bottom over a given measuring length. Therefore, the $R_p/R_{max}$ ratio means the percentage of the convex portions based on the convex-concave portions.

The width of the protrusion means a distance between bases of the protrusions (corresponding to "W" in FIG. 1). This is determined by observing under a scanning electron microscope (SEM). The density of the protrusion is similarly determined.

The area ratio of the protrusions is determined by processing an image of SEM and measuring the area occupied with the protrusions per 100 μm²

The shape of the protrusion is not limited. It may be circular, elliptical, square or mixture thereof. In case of protrusions other than the circular protrusion, broadest distance is regarded as the width of the protrusion. When there are the protrusions having different width, an average of the widths of 20 or more protrusions is regarded as the width of the protrusion.

The substrate of the present invention has the protrusion having the height of 50 to 1000 Å, preferably 50 to 700 Å, more preferably 100 to 400 Å. When the height of the protrusion is less than a lower limit, the effect of reducing the contact area between the head and the magnetic disc is poor and thereby, the CSS and the anti-head stick properties are not well improved. On the other hand, when the height of the profusion is above an upper limit, the reproducing noise is pronounced and thereby, the S/N ratio is lowered.

The substrate of the present invention has the protrusion having the width of 0.01 to 1 μm, preferably 0.05 to 0.5 μm, more preferably 0.05 to 0.3 μm, the density of 10 to 1000 per 100 μm², preferably 10 to 500 per 100 μm², more preferably 20 to 300 per 100 μm², and the area ratio of 0.1 to 50%, preferably 0.1 to 30%, more preferably 0.1 to 20%.

When the width, the density and the area ratio of the protrusion are less than the lower limit, an excess pressure is applied to the magnetic disc when the head is contacted with the magnetic disc because the contact area between the head and the magnetic disc is too small and thereby, the magnetic disc is worn, leading to the deterioration in the CSS property. On the other hand, when the width, the density and the area ratio of the protrusion are above the upper limit, the contact area between the head and the magnetic disc is not efficiently reduced and thereby, the CSS property and the anti-head properties are not well improved.

The substrate of the present invention has the $R_p/R_{max}$ ratio of 60% or more, preferably 70% or more. The $R_p/R_{max}$ ratio means the percentage of the convex portions based on the convex-concave portions. Therefore, the $R_p/R_{max}$ ratio being 60% or more means that the convex portions are mainly formed on the surface of the substrate. The higher the $R_p/R_{max}$ ratio is, more flat the surface of the substrate except the convex portions is. In the substrate on which little concave portions are formed as described in the above, the reproducing noise is minor, leading to the higher S/N ratio.

According to the prior chemical etching treatment, the substrate has the $R_p/R_{max}$ ratio of about 50%. That is, the surface of the substrate is randomly roughened. Alternatively, a part of the substrate has the $R_p/R_{max}$ ratio of not more than 40%, that is, the concave portions being mainly formed on the surface of the substrate. In the prior art, the formation of the convex portions as a factor of the consact area between the head and the magnetic disc is not controlled and thereby, the repeatability of the CSS property is poor. Further, because of the excess formation of the concave portions, the reproducing noise is large, leading to the lowering of the S/N ratio.

The pattern of the protrusions on the surface of the glass substrate is substantially reflected to the surface of the magnetic disc having the glass substrate on which the undercoat film, the magnetic film and the protective film are successively formed. The magnetic disc has the protrusions whose pattern is similar to those of the glass substrate. Thus, the magnetic disc has fine protrusions on its surface, the protrusions having a height of 50 to 1000 Å, a width of 0.01 to 1 µm, a density of 10 to 1000 per 100 µm² and an area ratio of 0.1 to 50%, and a ratio of peak height on a mean line ($R_p$) to maximum height ($R_{max}$) with respect to surface roughness of the substrate being at least 60%.

The present invention relates to a method for preparing the above-mentioned glass substrate.

In the method for preparing the glass substrate, the protrusions can be formed on the surface of the glass substrate according to any one of the following three methods:

(1) a method utilizing the chemical etching treatment, (2) a method utilizing a photoresist, and (3) a method utilizing a contact treatment with hydrofluoric acid vapor.

Among the above three methods, the method utilizing the chemical etching treatment is preferable. As the etching liquid, an aqueous solution containing hydrofluoric acid, an aqueous solution containing hydrofluoric acid and fluoride, an aqueous solution containing hydrofluoric acid and inorganic acid and an aqueous solution containing hydrofluoric acid and organic acid are usable. The use of the aqueous solution containing hydrofluoric acid in a low concentration and potassium fluoride is preferable. Particularly, the use of the aqueous solution containing 0.15 to 0.9N, preferably 0.3 to 0.9N of hydrofluoric acid and 2 to 6N of potassium fluoride is more preferable. When the concentration of the potassium fluoride is less than the lower limit, the height of the protrusion on the surface of the substrate is more than 1000 Å and the $R_p/R_{max}$ ratio is about 50%. On the other hand, when the concentration of the potassium fluoride is above the upper limit, the height of the protrusion on the surface of the substrate is less than 50 Å and further insoluble matters may be precipitated in the etching liquid. When the concentration of the hydrofluoric acid is less than the lower limit, the height of the protrusion on the surface of the substrate is also less than 50 Å because the etching rate is too slow. On the other hand, when the concentration of the hydrofluoric acid is above the upper limit, the height of the protrusion on the surface of the substrate is not constant and alternatively, the $R_p/R_{max}$ ratio is 50% or less.

The etching liquid has preferably the temperature of 5° to 20° C. When the liquid temperature is less than the lower limit, the height of the protrusion on the surface of the substrate is also less than 50 Å because the etching rate is too slow and further, the insoluble matters are precipitated in the etching liquid. On the other hand, when the liquid temperature is above the upper limit, the height of the protrusion on the surface of the substrate is not constant.

Firstly, the glass substrate is immersed in the etching liquid which comprises the aqueous solution containing hydrofluoric acid (HF) and potassium fluoride (KF). By reacting the surface of the glass substrate with HF, the etching proceeds and silicon tetrafluoride ($SiF_4$) is produced as the reaction product. Because the resultant silicon tetrafluoride ($SiF_4$) is very reactive, it reacts with KF in the etching liquid immediately and an almost insoluble potassium silicofluoride ($K_2SiF_6$) is produced. The thus-produced silicofluoride is attached on the surface of the glass substrate and thereby, the etching is inhibited. By controlling the concentration of HF concerned in the progress of the etching and the concentration of KF concerned in the inhibition of the etching, therefore, the fine and island protrusions are formed on the surface of the glass substrate.

After the chemical etching treatment, the glass substrate is immersed in water for washing and thereby, the etching liquid and $K_2SiF_6$ attached on the surface of the glass substrate are released and diffused in water. Immediately, a part of HF is reacted again with the surface of the glass substrate.

In order to certainly obtain the CSS property, the substrate having the protrusions with the height which is about several hundreds Å and almost constant, preferably within the range of about ±25 Å is preferable. For obtaining such a substrate, the condition of water-washing after the chemical etching treatment should be controlled. In this case, the temperature of water for washing has the temperature of 15° C. or less, preferably 10° C. or less. When the water temperature is less than 15° C., HF attached on the surface of the glass substrate is hardly reacted with the surface of the glass substrate and thereby, the deviation in the height of the protrusion can be inhibited and easily controlled to be within the range of ±25 Å. When the water temperature is above 15° C., however, the deviation in the height of the protrusion is increased and above ±50 Å.

Further, the present invention relates to the magnetic disc having the above-mentioned glass substrate.

The magnetic disc of the present invention comprises the glass substrate on which the undercoat film, the magnetic film and the protective film are successively formed. The undercoat film, the magnetic film and the protective film are formed according to any known process such as sputtering, coating and depositing.

The undercoat film generally comprises an element belonging to IVa to VIa groups in periodic table such as Cr, Ti, V and W; an element belonging to IIb to IVb groups in periodic table such as Zn, Al, Ge and Si; their oxides, nitrides, carbides and borides; or mixture thereof. The undercoat film may comprises an alloy such as NiP or Permalloy.

The magnetic film generally comprises a Co-type magnetic material such as CoCr, CoNiCr, CoTaCr, CoPt, CoCrPt, CoCrB, CoCrTaB, CoCrPtB, CoP, CoNiP, CoZnP, CoNiZnP and CoNiO; or a Fe-type magnetic material such as ferrite and iron nitride. The magnetic film may be a film magnetized in in-planar or perpendicular direction.

The protective film generally comprises C, $SiO_2$ or $ZrO_2$.

Generally, the thickness of each of the substrate, the undercoat film, the magnetic film and the protective film is selected from the range of 0.2 to 2 mm, the range of 200 to 3000 Å, the range of 100 to 1000 Å and the range of 50 to 500 Å, respectively.

EXAMPLES

The following examples will more fully illustrate the embodiments of the present invention. It will be apparent to one of those skilled in the art that many changes and modifications can be made thereto without departing from the spirit or scope of the invention.

In the examples, each determination was conducted as follows:

(1) the etching rate

It was calculated based on the difference in weight before and after the etching treatment. The density of the glass substrate is assigned to be 2.5 g/cm³.

(2) the surface unevenness of the disk

By visually observing the appearance of the surface of the disk under a lamp of 500,000 lux, the proportion of the area with uneven appearance was determined.

(3) the height of protrusion and the deviation of the height of the protrusion

It is considered that when $R_p/R_{max}$ is 60% or more, the convex portions are mainly formed on the surface of the substrate. If $R_p/R_{max}$ being 60% or more, a mode in deflection width is regarded as a flat part of the surface of the substrate in the present invention. The difference from the flat portion to the peak is the height of the protrusion.

The height of the protrusion was determined using the surface roughness meter (Tolystep ex. Rank Taylor Hobson) having the stylus with the tip of 0.2 μm square, over 250 μm in length.

The height of the protrusion is determined by selecting any line in radial direction on the substrate and then determining each height of the protrusions on an inner region, a center region and an outer region along the selected line, from which an average is calculated. The deviation of the height of the protrusion corresponds to the difference with respect to the height of the protrusion between the highest value and the lowest value among the determined values.

(4) the width of the protrusion and the density of the protrusion

The width and the density of the protrusion were determined under the scanning electron microscope. In case of the protrusions other than circular one, the broadest distance of the protrusion was determined. When there are protrusions whose width was varied, the average of the determined values as to the width of 20 or more protrusions was calculated.

(5) the CSS property

When either a static friction force or a dynamic friction force was over 20 gf, the CSS property was evaluated to be bad.

(6) the head stick property

The head and the magnetic disk were left at an atmosphere of the temperature of 25° C. and the humidity of 80% for 1 hour while they stood in contact with each other.

When the static friction force on starting was over 20 gf, the head stick property was evaluated to be bad.

(7) the S/N ratio

The S/N ratio was determined using a certifier for evaluating the magnetic disc.

(8) the area ratio of protrusion

The image of the protrusions observed as a secondary electron image under the scanning electron microscope (SEM) has frequently higher luminance as compared with the image of the background, that is, the flat portions of the surface of the substrate. Margines of the protrusions observed in the SEM image are extracted based on the difference with respect to the luminance between the protrusions and the background and then, the area of the inside of each protrusion surrounded by the margin is summed. The area ratio of the protrusions is determined by calculating the sum of the area of the inside of each protrusion based on the total area of a field of view. The field of view is 100 μm².

The SEM conditions are as follows: tilt angle of sample being 40°, acceleration voltage being 15 kV, and magnification being 10,000.

Examples 1 to 6 and Comparative Examples 1 to 4

A substrate comprising a chemically strengthened 3,5"-soda lime silicate glass was washed with a neutral detergent, washed with an ultrapure water and then subjected to the chemical etching treatment using an aqueous solution containing potassium fluoride and hydrofluoric acid and kept at 10° C., thereby the fine protrusions were formed on the surface of the glass substrate. The glass substrate for the magnetic disc had the thickness of 1.3 mm.

The conditions on the chemical etching treatment and the pattern of the resultant protrusions are shown in Tables 1 and 2.

Figure 2:
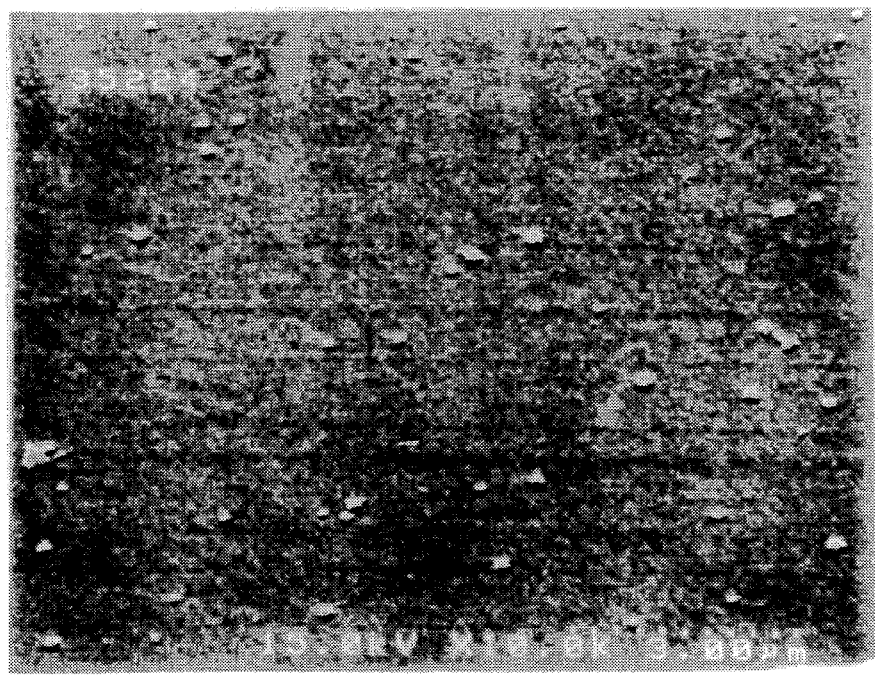
FIG. 2 shows a scanning electron microphotograph per the field of view of 100 μm² of the glass substrate prepared in Example 5.
Figure 4:
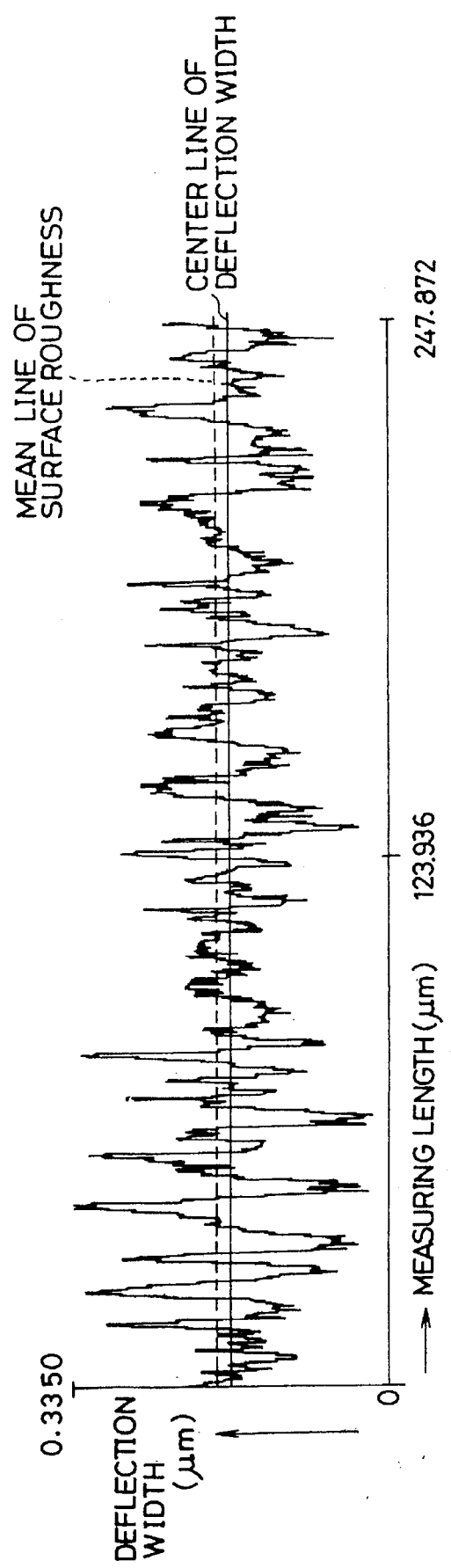
FIG. 4 shows a chart on the surface roughness of the glass substrate prepared in Comparative Example 4.

A scanning electron microphotograph per the field of view of 100 μm² of the glass substrate prepared in Example 5 is shown in FIG. 2. And, a chart on the surface roughness of the glass substrate prepared in Comparative Example 4, which was determined by Talystep at the rate of 0.004 mm per sec is shown in FIG. 4.

On the above glass substrate, the undercoat film comprising Cr (1000 Å), the magnetic film comprising Co-Cr-Ta alloy (600 Å) and the protective film comprising carbon (300 Å) were successively formed according to the sputtering process. Thereafter, a fluorine-type lubricant was coated in the thickness of 25 Å according to a dipping method, thereby the magnetic disc was prepared.

The CSS property, the head stick property and the S/N ratio of the resultant magnetic disc were evaluated. The results are shown in Table 3.

Examples 7 to 8 and Comparative Examples 5 to 7

The substrate for the magnetic disc and the magnetic disc were prepared according to the procedures similar to those in Example 1, provided that the temperature of the etching liquid was changed.

The conditions on the chemical etching treatment and the pattern of the resultant protrusions are shown in Tables 1 and 2.

Figure 3:
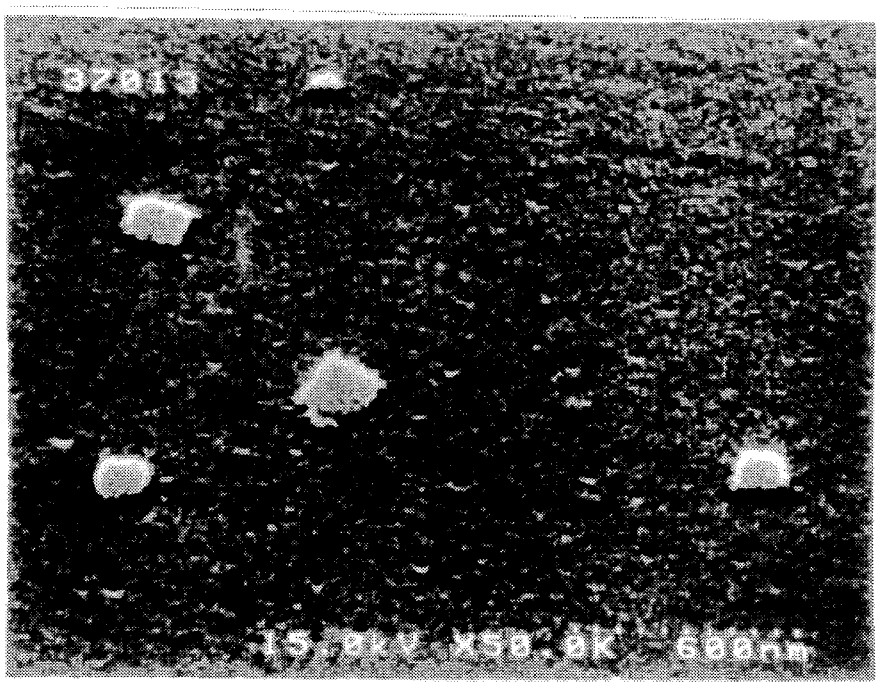
FIG. 3 shows the scanning electron microphotograph (x 50,000) of the glass substrate prepared in Example 7.
Figure 5:
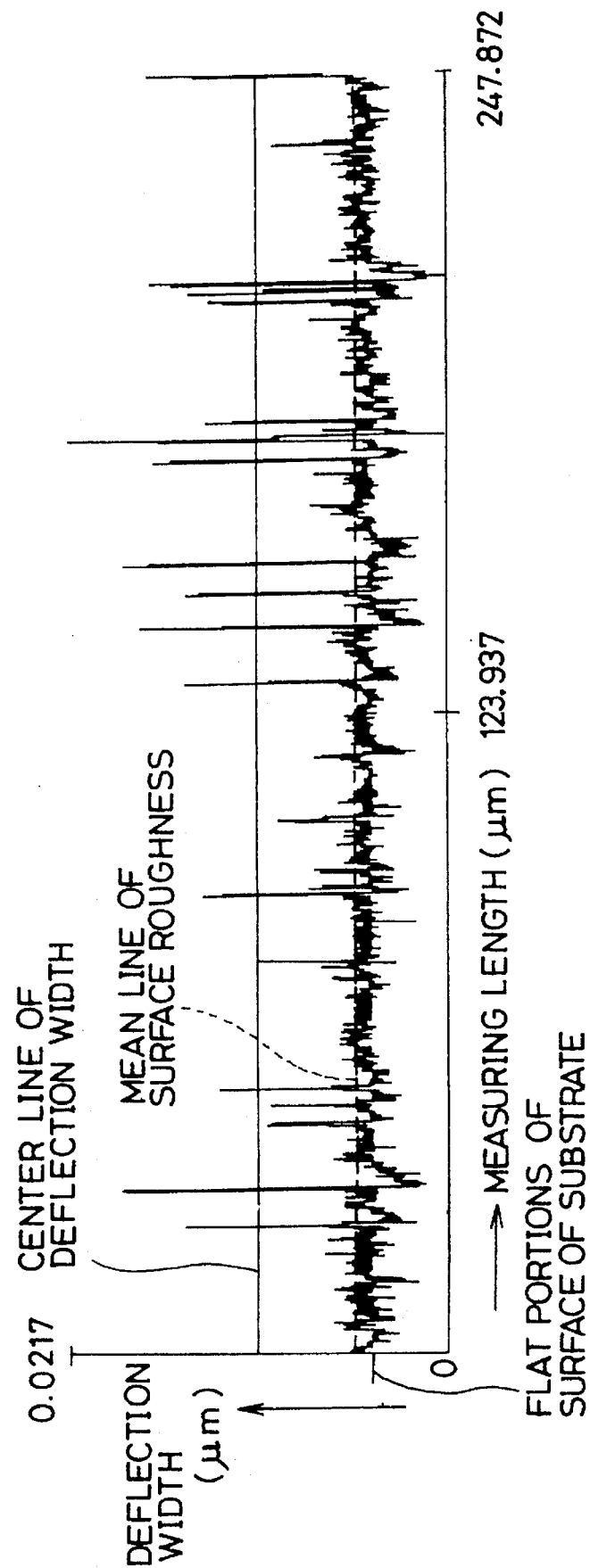
FIG. 5 shows the chart on the surface roughness of the glass substrate prepared in Example 7.

The scanning electron microphotograph (x 50,000) of the glass substrate prepared in Example 7 is shown in FIG. 3. And, the chart on the surface roughness of the glass substrate prepared in Example 7, which was determined by Talystep at the rate of 0.004 mm per sec is shown in FIG. 5.

The results on the evaluation of the properties of the magnetic disc are shown in Table 3.

Examples 9 to 10 and Comparative Examples 8 to 9

The substrate for the magnetic disc and the magnetic disc were prepared according to the procedures similar to those in Example 1, provided that the glass substrate comprising an unstrengthened soda lime silicate glass (Example 9 and Comparative Example 8) or a non-alkali glass (Example 10 and comparative Example 9) was used.

The conditions on the chemical etching treatment and the pattern of the resultant protrusions are shown in Tables 1 and 2.

The results on the evaluation of the properties of the magnetic disc are shown in Table 3.

TABLE 1

| | KF concentration (N) | HF concentration (N) | liquid temperature (°C.) | time (min) |
|---|---|---|---|---|
| Ex. 1 | 2 | 0.3 | 10 | 2 |
| Ex. 2 | 2 | 0.9 | 10 | 2 |
| Ex. 3 | 4 | 0.6 | 10 | 2 |
| Ex. 4 | 6 | 0.3 | 10 | 2 |
| Ex. 5 | 6 | 0.9 | 10 | 2 |
| Ex. 6 | 3 | 0.15 | 10 | 4 |
| Ex. 7 | 4 | 0.6 | 5 | 2 |
| Ex. 8 | 4 | 0.6 | 20 | 2 |
| Ex. 9 | 4 | 0.6 | 10 | 2 |
| Ex. 10 | 5 | 0.8 | 10 | 2 |
| Comp. Ex. 1 | 0.5 | 0.6 | 10 | 2 |
| Comp. Ex. 2 | 4 | 6 | 10 | 2 |
| Comp. Ex. 3 | 4 | 0.1 | 10 | 2 |
| Comp. Ex. 4 | 4 | 5 | 10 | 2 |
| Comp. Ex. 5 | 3 | 0.8 | 0 | 5 |
| Comp. Ex. 6 | 4 | 0.6 | 30 | 2 |
| Comp. Ex. 7 | 4 | 6 | 30 | 1 |
| Comp. Ex. 8 | 4 | 2 | 10 | 2 |
| Comp. Ex. 9 | 1 | 0.6 | 10 | 2 |

TABLE 2

| | height (Å) | deviation of height | width (μm) | density (/100 μm$^2$) | $R_p/R_{max}$ (%) | area ratio (%) |
|---|---|---|---|---|---|---|
| Ex. 1 | 350 | 300–400 | 0.1 | 200 | 80 | 1 |
| Ex. 2 | 450 | 400–500 | 0.05 | 400 | 70 | 0.5 |
| Ex. 3 | 250 | 210–290 | 0.2 | 100 | 90 | 3 |
| Ex. 4 | 150 | 120–180 | 0.5 | 20 | 90 | 4 |
| Ex. 5 | 200 | 150–250 | 0.3 | 40 | 80 | 2 |
| Ex. 6 | 100 | 80–120 | 0.02 | 400 | 80 | 0.1 |
| Ex. 7 | 150 | 120–180 | 0.2 | 150 | 80 | 5 |
| Ex. 8 | 350 | 280–420 | 0.1 | 200 | 70 | 1 |
| Ex. 9 | 200 | 160–240 | 0.2 | 150 | 80 | 5 |
| Ex. 10 | 150 | 100–200 | 0.4 | 300 | 80 | 28 |
| Comp. Ex. 1 | 1000 | 1200–1400 | 0.1 | 700 | 50 | 4 |
| Comp. Ex. 2 | * | ($R_{max}$: 4000Å) | | | 50 | — |
| Comp. Ex. 3 | <50 | <50 | 0.7 | 20 | 60 | 8 |
| Comp. Ex. 4 | * | ($R_{max}$: 3400Å) | | | 50 | — |
| Comp. Ex. 5 | <50 | <50 | 0.4 | 50 | 60 | 6 |
| Comp. Ex. 6 | 1500 | 500–2500 | 0.1 | 100 | 70 | 0.5 |
| Comp. Ex. 7 | * | ($R_{max}$: 8000Å) | | | 50 | — |
| Comp. Ex. 8 | 1500 | 1000–2000 | 0.1 | 200 | 60 | 1 |
| Comp. Ex. 9 | 1500 | 1000–2000 | 0.2 | 600 | 70 | 15 |

*protrusion was not observed

TABLE 3

| | CSS property | | | S/N ratio (dB) |
|---|---|---|---|---|
| | number of cycle | result | head stick result | |
| Ex. 1 | 20000 | ○ | ○ | 38 |
| Ex. 2 | 20000 | ○ | ○ | 36 |
| Ex. 3 | 20000 | ○ | ○ | 40 |
| Ex. 4 | 20000 | ○ | ○ | 41 |
| Ex. 5 | 20000 | ○ | ○ | 38 |
| Ex. 6 | 20000 | ○ | ○ | 40 |

TABLE 3-continued

| | CSS property | | | S/N ratio (dB) |
|---|---|---|---|---|
| | number of cycle | result | head stick result | |
| Ex. 7 | 20000 | ○ | ○ | 40 |
| Ex. 8 | 20000 | ○ | ○ | 36 |
| Ex. 9 | 20000 | ○ | ○ | 37 |
| Ex. 10 | 20000 | ○ | ○ | 39 |
| Comp. Ex. 1 | 20000 | ○ | ○ | 26 |
| Comp. Ex. 2 | 2000 | x | ○ | 21 |
| Comp. Ex. 3 | 5000 | x | x | 33 |
| Comp. Ex. 4 | 2000 | x | ○ | 22 |
| Comp. Ex. 5 | 2000 | x | x | 32 |
| Comp. Ex. 6 | 20000 | ○ | ○ | 28 |
| Comp. Ex. 7 | 1000 | x | ○ | 20 |
| Comp. Ex. 8 | 20000 | ○ | ○ | 24 |
| Comp. Ex. 9 | 20000 | ○ | ○ | 27 |

Examples 11 to 14

A substrate comprising a chemically strengthened 3,5"-soda lime silicate glass was washed with a neutral detergent, washed with an ultrapure water, subjecting to the chemical etching treatment using an aqueous solution containing potassium fluoride and hydrofluoric acid whose concentrations are shown in Table 4 and kept at 10° C. and washed with water kept at 0° to 15° C., thereby the fine protrusions were formed on the surface of the glass substrate. The glass substrate for the magnetic disc had the thickness of 1.3 mm.

The treating conditions and the pattern of the resultant protrusions are shown in Tables 4 and 5.

On the above glass substrate, the undercoat film comprising Cr (1000 Å), the magnetic film comprising Co-Cr-Ta alloy (600 Å) and the protective film comprising carbon (300 Å) were successively formed according to the sputtering process. Thereafter, the fluorine-type lubricant was coated in the thickness of 25 Å according to a dipping method, thereby the magnetic disc was prepared.

The CSS property, the head stick property and the S/N ratio of the resultant magnetic disc were evaluated. The results are shown in Table 6.

Comparative Examples 10 and 11

The substrate for the magnetic disc and the magnetic disc were prepared according to the procedures similar to those in Example 11, provided that the temperature of the washing water was changed to be 20° C. or 35° C.

The treating conditions and the pattern of the resultant protrusion are shown in Tables 4 and 5.

The results on the evaluation of the properties of the magnetic disc are shown in Table 6.

TABLE 4

|  | KF concentration (N) | HF concentration (N) | washing water temperature (°C.) |
| --- | --- | --- | --- |
| Ex. 11 | 4 | 0.5 | 0 |
| Ex. 12 | 4 | 0.5 | 10 |
| Ex. 13 | 4 | 0.5 | 15 |
| Ex. 14 | 3 | 0.3 | 10 |
| Comp. Ex. 10 | 4 | 0.5 | 20 |
| Comp. Ex. 11 | 3 | 0.3 | 35 |

TABLE 5

|  | etching rate (Å/min) | surface unevenness (%) | height (Å) | deviation of height (Å) | width (μm) | area ratio (%) |
| --- | --- | --- | --- | --- | --- | --- |
| Ex. 11 | 200 | 0 | 220 | 210–230 | 0.2 | 3 |
| Ex. 12 | 250 | 2 | 230 | 220–240 | 0.2 | 2 |
| Ex. 13 | 300 | 5 | 250 | 230–270 | 0.2 | 2 |
| Ex. 14 | 150 | 0 | 150 | 140–160 | 0.1 | 1 |
| Comp. Ex. 10 | 500 | 20 | 250 | 200–300 | 0.2 | 1 |
| Comp. Ex. 11 | 800 | 40 | 450 | 250–650 | 0.05 | 0.5 |

TABLE 6

|  | CSS property | | head stick result | S/N ratio (dB) |
| --- | --- | --- | --- | --- |
|  | number of cycle | result |  |  |
| Ex. 11 | 100000 | o | o | 42 |
| Ex. 12 | 100000 | o | o | 42 |
| Ex. 13 | 100000 | o | o | 41 |
| Ex. 14 | 100000 | o | o | 40 |
| Comp. Ex. 10 | 50000 | x | o | 40 |
| Comp. Ex. 11 | 70000 | x | o | 35 |

EFFECT OF THE INVENTION

The magnetic disc according to the present invention has the substrate with appropriate protrusions on its surface, thereby the friction force and the adsorbing force between the head and the magnetic disc can be reduced, leading to the improvement of the CSS and the anti-head stick properties. In addition, the S/N ratio is not affected because the fine concave portions formed on the surface of the substrate are shallow.

In the method for preparing the substrate for the magnetic disc according to the present invention, the etching rate is suitably moderated because the etching liquid having the low HF concentration and the low temperature was used for the chemical etching treatment. Therefore, the protrusions can be formed on the surface of the substrate very evenly and with high repeatability. In addition, the flatness of the glass substrate is not deteriorated and the strength of the glass substrate is not reduced.

What is claimed is:

1. A process for preparing a substrate for a magnetic disc, comprising subjecting a glass substrate to a chemical etching treatment using an aqueous solution containing hydrofluoric acid at a concentration of 0.15 to 0.9N and potassium fluoride at a concentration of 2 to 6N, wherein the temperature of the solution is 5° to 20° C.

2. A process as claimed in claim 1, wherein the glass substrate is subjected to the chemical etching treatment using the aqueous solution containing hydrofluoric acid at a concentration of 0.3 to 0.9N and potassium fluoride.

3. A process as claimed in claim 2, wherein after the chemical etching treatment, the glass substrate is washed with water at the temperature of 15° C. or less in order to prepare the substrate by forming a magnetic film thereon for preparing a magnetic disc.

4. A process for preparing a substrate for a magnetic disc, comprising subjecting a glass substrate to a chemical etching treatment using an aqueous solution containing hydrofluoric acid at a concentration of 0.15 to 0.9N and potassium fluoride at a concentration of 2 to 6N, wherein the temperature of the solution is 5° to 20° C. and then washing the water at the temperature of 15° C. or less.

* * * * *